United States Patent
Ogura

(10) Patent No.: US 8,544,000 B2
(45) Date of Patent: *Sep. 24, 2013

(54) INFORMATION PROCESSING DEVICE WITH AN AUTOMATIC RETURN UNIT FOR RETURNING A LICENSE

(75) Inventor: Yoshihiro Ogura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 9 days.

This patent is subject to a terminal disclaimer.

(21) Appl. No.: 13/114,685

(22) Filed: May 24, 2011

(65) Prior Publication Data

US 2011/0296405 A1 Dec. 1, 2011

(30) Foreign Application Priority Data

May 28, 2010 (JP) ................................ 2010-123412

(51) Int. Cl.
*G06F 9/445* (2006.01)

(52) U.S. Cl.
USPC .......... 717/178; 717/172; 717/177; 717/168; 717/173; 726/27; 726/31

(58) Field of Classification Search
None
See application file for complete search history.

(56) References Cited

U.S. PATENT DOCUMENTS

| | | | |
|---|---|---|---|
| 6,615,166 B1 * | 9/2003 | Guheen et al. ................... | 703/27 |
| 6,854,016 B1 * | 2/2005 | Kraenzel et al. ............... | 709/229 |
| 7,068,680 B1 * | 6/2006 | Kaltenmark et al. .......... | 370/469 |
| 7,290,047 B2 * | 10/2007 | Yamamoto et al. ........... | 709/223 |
| 7,343,297 B2 * | 3/2008 | Bergler et al. ................... | 705/59 |
| 7,725,399 B2 * | 5/2010 | Nakahara et al. ............... | 705/57 |
| 7,865,445 B2 * | 1/2011 | Maeda ............................. | 705/59 |
| 2004/0117784 A1 * | 6/2004 | Endoh .......................... | 717/169 |
| 2008/0005029 A1 * | 1/2008 | Ando .............................. | 705/51 |
| 2008/0127137 A1 * | 5/2008 | Becker et al. ................. | 717/140 |
| 2009/0031432 A1 * | 1/2009 | Wakai ............................. | 726/33 |
| 2009/0274304 A1 * | 11/2009 | Kobayashi ..................... | 380/277 |
| 2010/0235261 A1 * | 9/2010 | Lloyd et al. ..................... | 705/27 |
| 2011/0296405 A1 * | 12/2011 | Ogura .......................... | 717/178 |
| 2012/0047242 A1 * | 2/2012 | Iwasaki et al. ................ | 709/223 |
| 2012/0127490 A1 * | 5/2012 | Ogasawara et al. ............ | 358/1.2 |

FOREIGN PATENT DOCUMENTS

| | | |
|---|---|---|
| EP | 2161684 A1 * | 3/2010 |
| JP | 2006-018402 | 1/2006 |
| JP | 2007-249804 | 9/2007 |
| JP | 2009-026317 | 2/2009 |

* cited by examiner

*Primary Examiner* — Isaac Tecklu
*Assistant Examiner* — Hossain Morshed
(74) *Attorney, Agent, or Firm* — IPUSA, PLLC

(57) ABSTRACT

An information processing device includes an installation unit which downloads installation data of an application program corresponding to a function from an external device and installs the application program. A license acquisition unit acquires a license file from an external device in order to activate the function. A license managing unit manages presence of a license of the function independently of presence of the license file. A license transfer managing unit transfers the license from a source device to a destination device and updates the presence of the license of the function. An automatic return unit automatically returns the transferred license to the source device according to automatic return conditions stored in the information processing device.

17 Claims, 11 Drawing Sheets

FIG.2

| |
|---|
| CORRESPONDING FUNCTION IDENTIFIER (PRODUCT ID): 13579 |
| CORRESPONDING LICENSE IDENTIFIER (LICENSE ID): 2468ABCDE |
| LICENSE SOURCE DEVICE: DEVICE A |
| LICENSE DUPLICATION DEVICE: DEVICE B, DEVICE C |
| LICENSE POSSESSION: NO |
| AUTOMATIC RETURN: YES |
| RETURN TIMING: NIGHT (23:00) |
| RETURN DESTINATION: SOURCE DEVICE |

INFORMATION PROCESSING DEVICE WITH AN AUTOMATIC RETURN UNIT FOR RETURNING A LICENSE

BACKGROUND OF THE INVENTION

1. Field of the Invention

The present disclosure relates to a license management technology for managing licenses (use rights) of software resources used in various kinds of information processing devices, such as a PC (personal computer) and a copier.

2. Description of the Related Art

Conventionally, a license management system is used in order to install an application (software) in various kinds of information processing devices including a PC, a copier, etc. A server in the license management system is accessed by each of the information processing devices at a time of installation of the software or acquisition of a license of the software after installation, and a license is issued by the server by receiving and checking the information instrinsic to the device of an installation object. In each device, the license is obtained from the server to make the software usable by the device, and illegal use of the software by a device other than the device of an installation object in the license management system can be prevented.

There is a case in which it is desired to transfer a license from the license received device (license transfer source device) to another device (license transfer destination device). The license management systems according to the related art may be roughly divided into two types.

The first type is arranged to return the license from the license received device and newly introduce the software and the license into another device (installation, license acquisition). The second type is arranged to cancel the license of the license received device in the license management system, without returning the license from the license received device, and issue a license to another device (license transfer destination device) from the license management system.

Japanese Laid-Open Patent Publication No. 2006-018402 discloses a license management system which is aimed to transfer the license information of software while preventing illegal use of the software. This system manages the licenses of software installed in devices. When an issued license of software is received by a first device (license transfer source device) and a request for permission of introduction of this software is received from a second device (license transfer destination device), the system performs a license transfer process which sends a permission of the introduction of the software (license issue) to the second device and simultaneously inhibits use of the corresponding application program (software) by the first device. Hence, the system takes over the license information of the software from the previous device to the new device.

When the above-described license management system is used, it is necessary for a user to input a license key, containing ten or more digits of alphanumeric characters, at the time of license acquisition, in order to determine whether the user is a valid user for the prevention of illegal use.

Therefore, regardless of whether the license management system is of the first type or the second type, knowing a license key (memorized or license key information is at hand) is the prerequisite at the time of license transfer.

The license key is obtained at the previous license acquisition, and in many cases the license key is managed by an administrator of the license received device. The user often forgets the license key. In such a case, it is necessary to perform the acquisition of a license key again.

Even when the license key is known, there is a case in which the license transfer source device and the license transfer destination device are separated or apart from each other. In this case, the user has to perform the necessary operations on both the devices, which will require the complicated process. Although it is possible to have the operations performed by a person who is near either device, it is necessary to tell the license key information to the person.

There is also a demand for returning the license from the license transfer destination device to the original device after the function of the corresponding application program is used. In such a case, the license transfer operations have to be performed by the user again, which will require the complicated process.

SUMMARY OF THE INVENTION

In one aspect, the present disclosure provides an information processing device for use in a license management system in which licenses of programs are managed and exchanged between devices, the information processing device being capable of easily transferring a license of an installed program to another device, without increasing the user load and without using a license key, and capable of automatically returning the license to a desired device after the transferring of the license.

In an embodiment which solves or reduces one or more of the above-mentioned problems, the present disclosure provides an information processing device including: an installation unit that downloads installation data of an application program corresponding to a function from an external device and installs the application program in the information processing device; a license acquisition unit that acquires a license file from an external device in order to activate the function in the information processing device; a license managing unit that manages presence of a license of the function in the information processing device independently of presence of the license file; a license transfer managing unit that transfers the license from a source device to a destination device and updates the presence of the license of the function; and an automatic return unit that automatically returns the transferred license to the source device according to automatic return conditions stored in the information processing device.

Other objects, features and advantages of the present disclosure will become more apparent from the following detailed description when read in conjunction with the accompanying drawings.

BRIEF DESCRIPTION OF THE DRAWINGS

FIG. 2 is a diagram showing an example of information which is held by a license transfer managing part of the image forming device.

DETAILED DESCRIPTION OF THE PREFERRED EMBODIMENTS

A description will be given of embodiments of the present disclosure with reference to the accompanying drawings.

Figure 1:
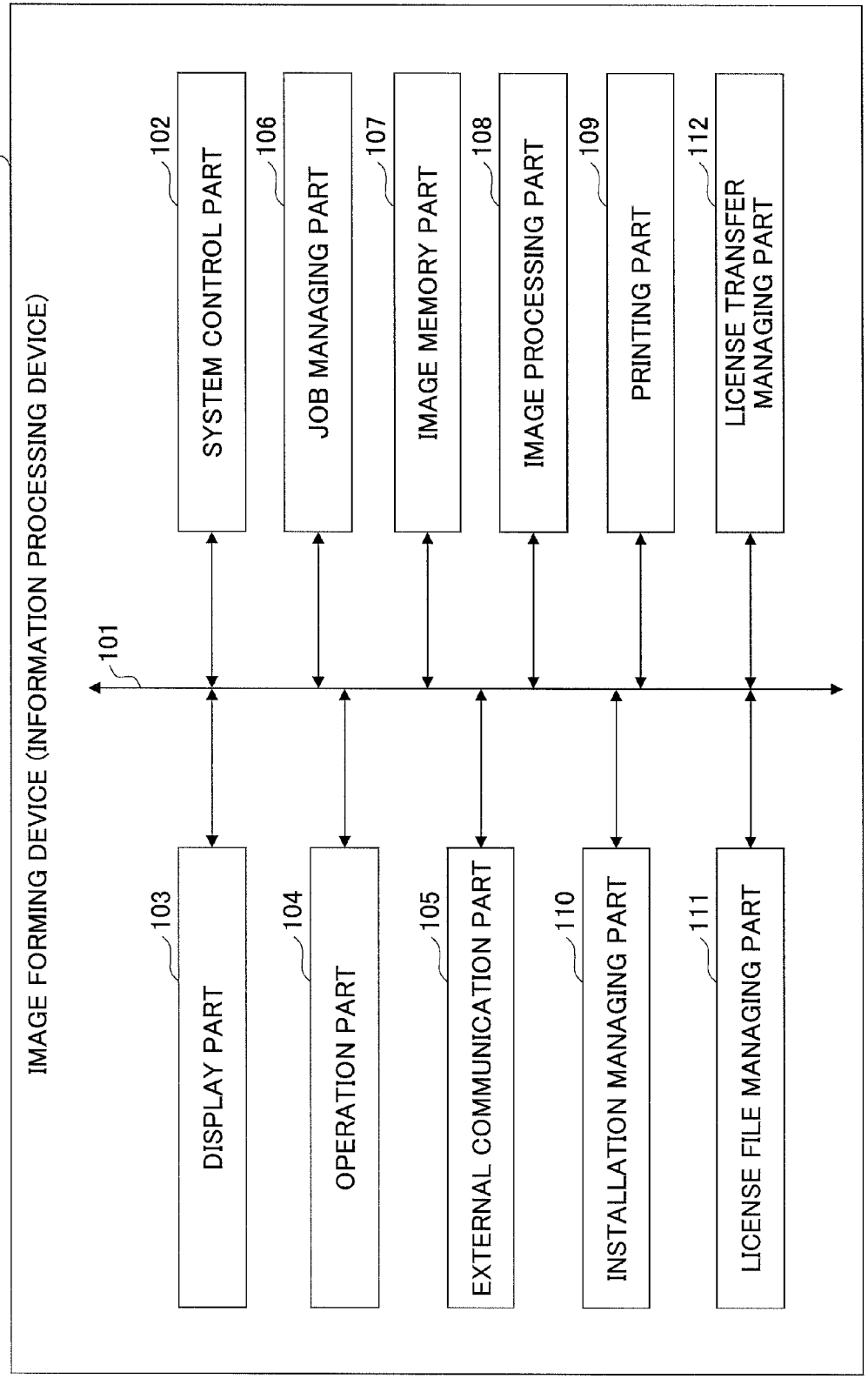
FIG. 1 is a diagram showing the composition of an image forming device which is an information processing device of an embodiment of the present disclosure.

FIG. 1 is a diagram showing the composition of an image forming device 1 of one embodiment of the present disclosure. As shown in FIG. 1, the image forming device 1 includes a system control part 102, a display part 103, an operation part 104, an external communication part 105, a job managing part 106, an image memory part 107, an image processing part 108, a printing part 109, an installation managing part 110, a license file managing part 111, and a license transfer managing part 112, which are interconnected by a system bus 101. The system bus 101 provides data paths which interconnect the respective parts (or units) which constitute the image forming device 1.

The system control part 102 is constituted by a CPU (Central Processing Unit) etc., develops a program stored in a non-volatile memory (ROM) into the work area (RAM), and controls operation of each part of the image forming device 1 by executing the program in the work area.

The display part 103 displays various display screens on a display device based on the display data received from the system control part 102.

The operation part 104 includes a keyboard which is provided with a set of function keys, and notifies an input signal generated upon depression of any of the keys in the keyboard by a user, to the system control part 102.

The external communication part 105 communicates the image forming device 1 with an external license management system (server) via a network. Examples of the external devices with which the external communication part 105 may include a component server and a memory device (SD card, etc.) in addition to the license management system.

The job managing part 106 performs scheduling of jobs, such as a print job. The job managing part 106 sends a notice to the license transfer managing part 112 after an end of a job of a corresponding function, when the automatic license return setting which is used to automatically return a license to a source device after an end of the transferring of the license to another device is designated by the "at end of job" option.

The license transfer managing part 112 performs the automatic return processing of a license.

The image memory part 107 stores image data, print data, and others. The image processing part 108 carries out image processing of input image data, such as scaling or rotation, and outputs the processed image data after the image processing to the printing part 109.

The printing part 109 is provided with a photoconductor drum, toner, a feeding part, a sheet ejection part, etc. In accordance with a printing command output from the system control part 102, the printing part 109 feeds a print sheet from the feeding part, forms an image corresponding to the image data received from the image processing part 108, on the photoconductor drum, develops the image from the photoconductor drum into a toner image with toner, fixes the toner image to the print sheet, and delivers the print sheet to the sheet ejection part.

The installation managing part 110 manages the configuration information of the software installed in the image forming device 1.

The license file managing part 111 manages the license file downloaded from the license management system using the external communication part 105, and determines the necessity of renewal of a license, automatic license return, etc., by using the license file information.

The license transfer managing part 112 manages the information accompanied with the transfer of a license file, and performs various processes accompanied with the license operation which is interlocked with other devices. Examples of the license operation may include sending a function/license request to another device and receiving a response from the device, and controlling the transferring (transmission) of a function/license. The license transfer managing part 112 controls deactivate/activate (automatic/manual) processing of other devices (devices disposed along a license transfer path). The license transfer managing part 112 manages the information of the automatic license return process performed after an end of the license transfer based on user's operation, and controls the automatic license return process.

FIG. 2 is a diagram showing an example of information (license transfer management information) which is held by the license transfer managing part 112. As shown in FIG. 2, the information includes an identifier of a corresponding function (product ID), an identifier of a corresponding license (license ID), a license source device, a license duplication device, license possession, automatic return, a return timing and a return destination. The license source device, the license duplication device, the license possession, the automatic return, the return timing and the return destination are new information items which are not present in the existing device.

The identifier of a corresponding function (product ID) is the information which identifies the function (software) introduced into a device. When carrying out license transfer between devices, a user is in the device used as a request destination. However, the function/license is not necessarily known beforehand, when acquiring a list of functions from a request destination to each device, a transferable function/license can be notified by referring to this information.

The identifier of a corresponding license (license ID) is the information of a license file for license-device association management when holding the information of whether there is any license (right) apart from license file existence. A license file is received from a license management system at the time of functional introduction. The license file managing part 111 holds the substance of a license file.

The license source device is a device which performs function/license transfer between devices without using a license management system. Depending on the license form, the deactivated/activated state will be considered after that with renewal of an automatic license, automatic deactivate (license return), or manual operation after transfer, and communication with a license management system will occur. However, as a license management system, the information (for example, serial No) which specifies a device at the time of communication with the corresponding device at the time of corresponding license issue is received, and license-device association management is carried out with the issued license in many cases. Therefore, it is not desirable that, at the time of being accessed from the devices to which the license is transferred as mentioned above, the license management system is accessed from another device other than the devices the licenses of which are managed by using the license-to-device association management. An error process is performed in such a case if the license management system manages the license-device associations between the licenses and the devices. However, if there is no license-device association that is managed, the license operation of the device having accessed the system in advance will be performed, and a conflict between such a device and the respective devices disposed on the license transfer path may arise. In order to avoid the problem and not to increase the load of the license transfer on the license management system, only the device (source device) having received the license for the first time is allowed to access the server of the license management system. Therefore, only the source device accesses the server and a conflict does not occur between the license managed by the server and the device specific information.

The license duplication device information will be described. The function/license transfer is performed between devices without using the license management system, but there is a case where updating/deletion of license files, such as an automatic license renewal and an automatic deactivate process (license return), is needed after the end of license transfer depending on the license form. In this case, only the source device is allowed to communicate with the license management system, and the source device needs to manage the license duplication files, such as updating/deletion of a license of the license transfer path (the reproduced license file is held at each device when the license is transferred). Therefore, it is necessary to detect all the devices disposed along the license transfer path, and this information of the license device is used for this purpose.

The license possession information will be described. When transferring a function/license, a license file is reproduced and provided to the request destination. The increase in the number of server-issued licenses may cause illegal use of the license to occur at a location which is unknown to the license management system. Therefore, when license reproduction is performed to transfer a function/license, the license possession in the license transfer source device is reset to "No", indicating that the license is already transferred, while the license possession in the license transfer destination device is set to "Yes", indicating that the license transferred is received and possessed. Thereby, use of the license possession information will prevent illegal use of the license.

The automatic return information will be described. There are several cases including a case where the license transferred has to be used over a long period and a case where the license transferred is needed only for a temporary use or a short period. The "automatic return" information is used to indicate whether or not the license after an end of the license transfer is to be automatically returned to the original device.

The return timing information will be described. When the automatic return option is designated by the "automatic return" information, the information indicating when the license is to be returned is needed. The return timing information is used to indicate when the license should be returned automatically, such as "after 2 hours" or "by tonight". Namely, the timing of returning the license is defined by a time of day of the return timing information.

The return destination information will be described. When the automatic return option is designated by the "automatic return" information, the information indicating where the license is to be returned is needed. The return destination information is used to indicate where the license should be returned automatically, such as "license transfer source device".

Figure 3:
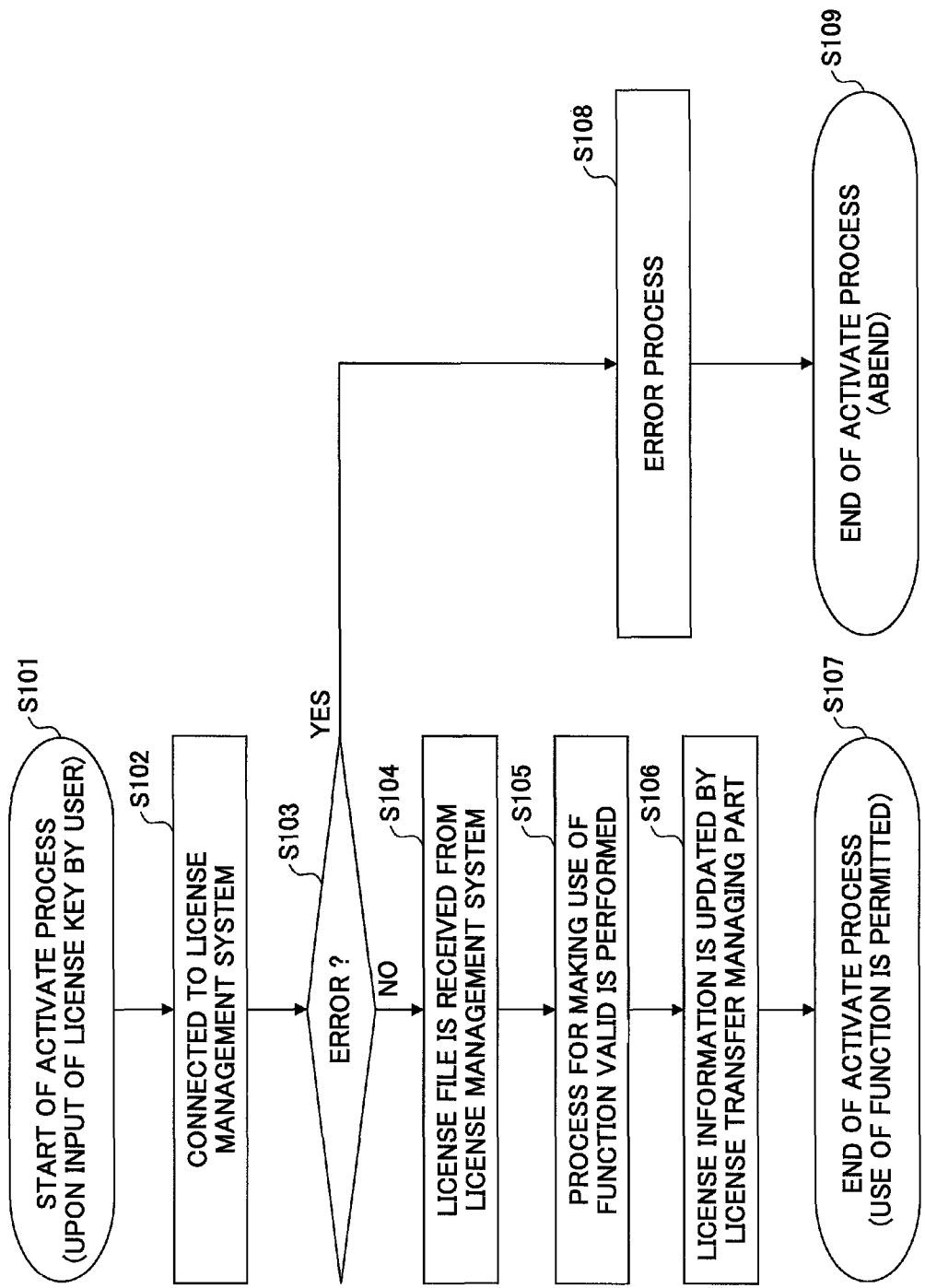
FIG. 3 is a flowchart for explaining an example of a process performed at the time of new installation/activation.

FIG. 3 is a flowchart for explaining an example of a process performed at the time of new installation/activation. The process at the time of license acquisition after the usual software installation is called the activate process. Installation of the software which performs a predetermined function does not activate the function. Only after the activate process is performed, the function is activated. It is also possible to deactivate the function after the activate process by performing the deactivate process.

As shown in FIG. 3, when a user inputs a license key on a screen of the image forming device for acquiring a license of a function of the installed software in order to use the function, the activate process of FIG. 3 is started in step S101. In step S102, the image forming device is connected to the license management system and the license management system checks whether a proper license key has been input.

In step S103, it is determined whether an error, such as a connection error or an improper license key, has occurred. When an error has occurred, the error process is performed in step S108, and the activate process is terminated (an abnormal end) in step S109.

When no error has occurred, the justification of the input license key is checked and a license file is received from the license management system in step S104. A license type, a use term, etc. are stored in the license file.

In step S105, a process for making use of the function valid is performed by using the received license file. According to the use term contained in the license file, use of the function is permitted.

In step S106, the license information is updated by the license transfer managing part 112. Therefore, the license information updated is designated by the ID of the license source device, the product ID of a corresponding function, and the license ID of a corresponding license file, and the license possession information is set to indicate that the license has been received. In this process, there is no information of the license duplication which is stored. Such information is updated at the time of transferring the license of the function to other devices.

In step S107, use of the function is allowed and the activate process of FIG. 3 is terminated.

Figure 4:
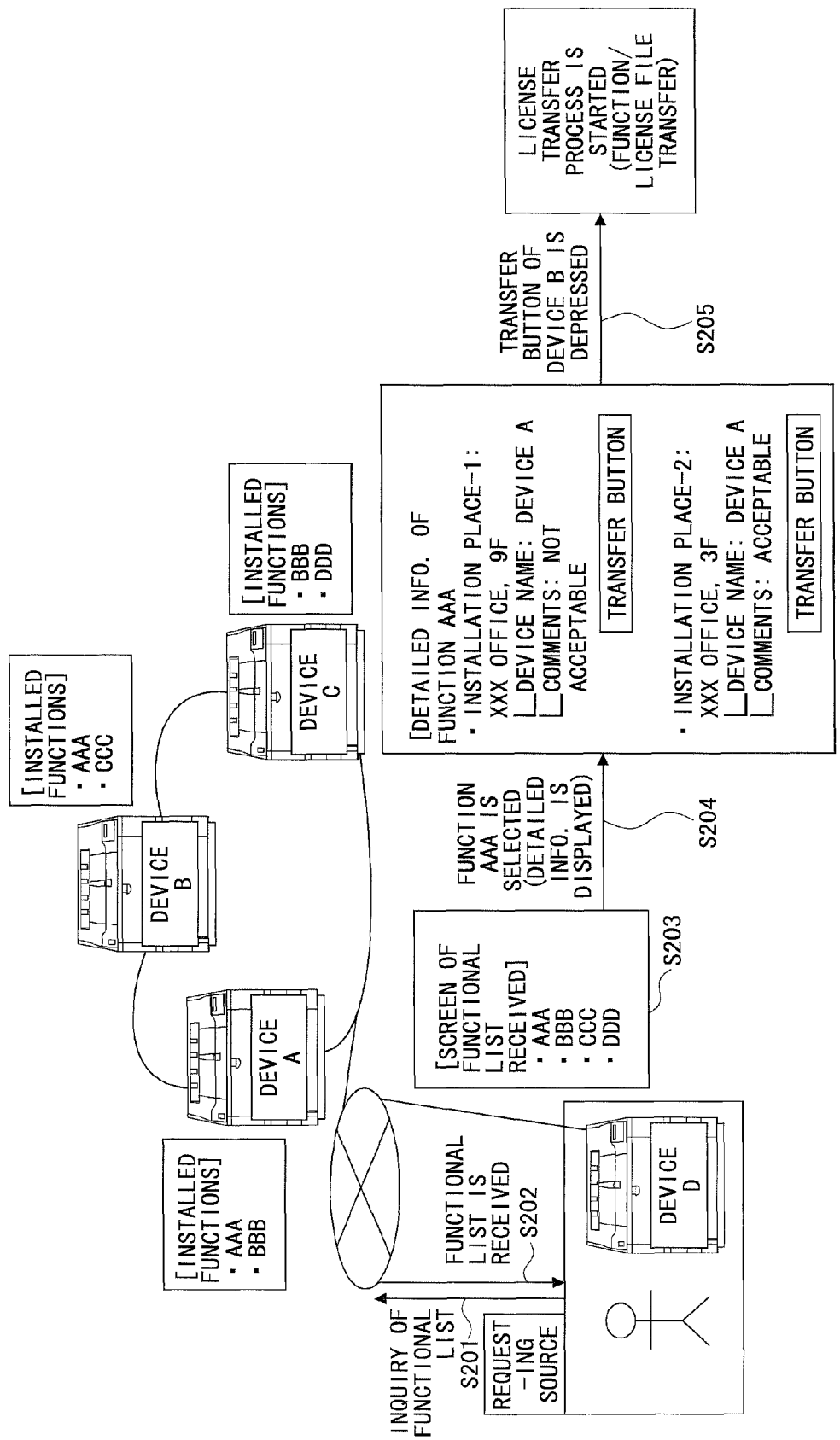
FIG. 4 is a diagram showing an example of a process in which a function/license to be transferred to a license transfer source device (request destination) is selected by a license transfer destination device (request source).

FIG. 4 is a diagram for explaining an example of a process in which a function/license to be transferred to a license transfer source device (request destination) is selected by a license transfer destination device (request source).

As shown in FIG. 4, in step S201, a request for a list of functions is sent from the device D (request source) to the devices (A, B, C, . . . ) which are connected to the network. Each device receives the request and returns the information about the functions installed in that device, to the device D. In step S202, the device D acquires this information. It is not necessary that the response at this time include information about the firmware, the installation/uninstallation, or the function not related to the license transfer.

In step S203, the device D displays a screen on the display part in response to the request result from each device. If the user chooses a desired function or a required function in step S204, a detailed screen of the function is displayed. The detailed screen may include the information, including a name, a functional description, etc., of the function chosen.

The information which can serve as judgment material of whether it is made to transfer from which devices, such as "installation place", "function use frequency", "comments", is also applicable. In step S205, the user chooses one of the installation places in the detailed screen, and a command of the license transfer is performed to transfer the license to the installation place chosen.

Figure 5:
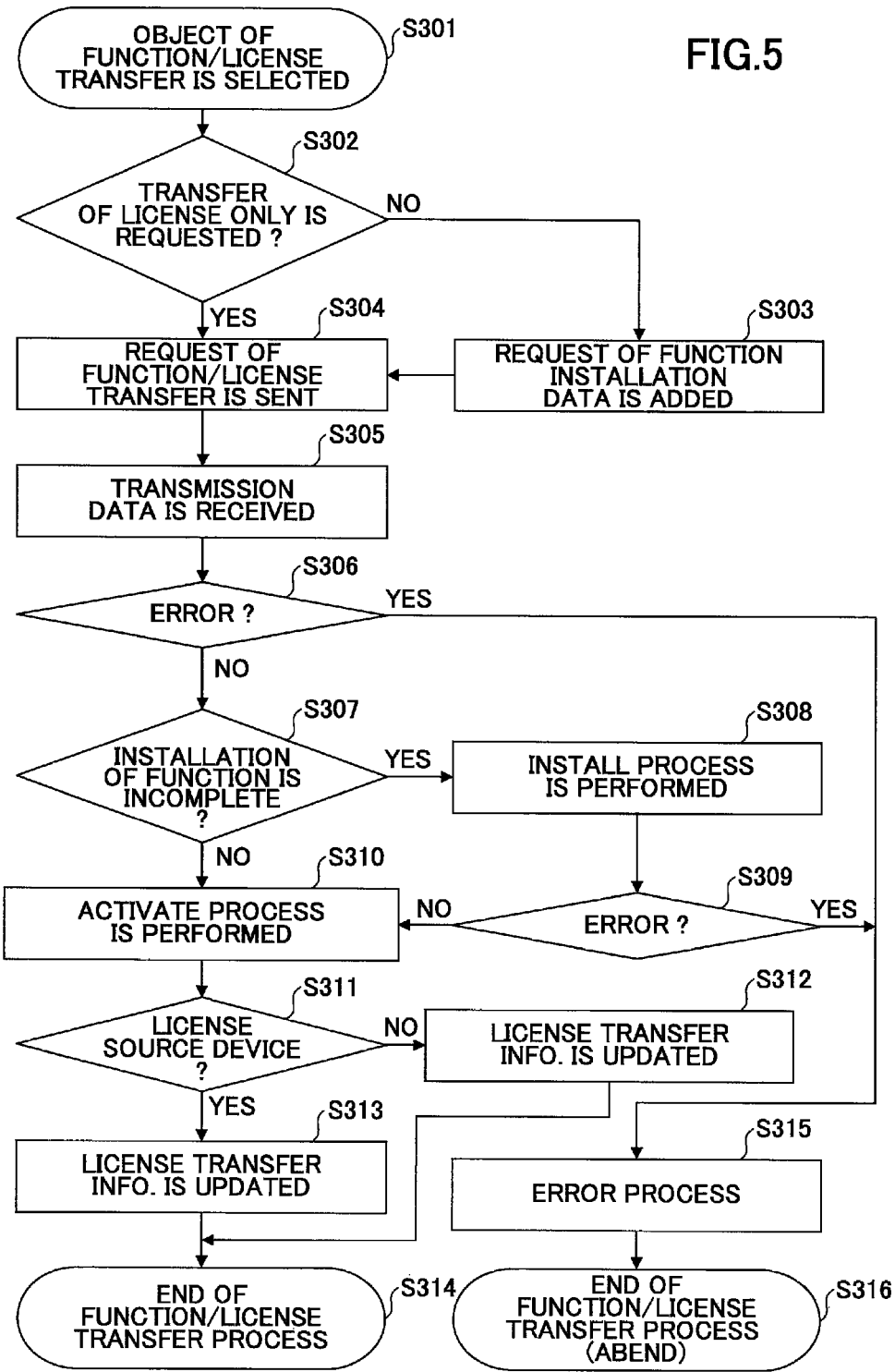
FIG. 5 is a flowchart for explaining an example of a process performed by the license transfer destination device (request source) during the license transfer.

FIG. 5 is a flowchart for explaining an example of a process performed by the license transfer destination device (request source) at the time of execution of license transfer.

If selection of the function/license transferred object is performed in step S301, the process of FIG. 5 is started. Before notifying the function/license transfer to a request destination, the state of the image forming device will be checked in step S302. This is because there are two different states of the image forming device when requesting the function/license transfer from the license transfer source device: one state in which the corresponding function is already installed but a license thereof is not acquired; and the other state in which the corresponding function is not installed and a license thereof is not yet acquired.

When the corresponding function is not installed and the license thereof is not yet acquired, the procedure of step S303 is performed. In step S303, a request of acquisition of installation data of the function to be installed is added to a request of acquiring the license which is sent to the license transfer source device.

In step S304, the request of acquiring the function/license is sent to the license transfer source device. When the request of acquiring the installation data of the function to be installed is added in step S303, the acquisition of the installation data of the function is also requested.

In step S305, the transmission data based on the license of the corresponding function is received.

When it is determined in step S306 that no error arises in the receiving of the transmission data, it is determined in step S307 whether the installation of the corresponding function is incomplete.

When the installation of the corresponding function is incomplete (when the acquisition of the installation data of the function is also requested), the installation process is performed using the received installation data of the function in step S308. If an error at the time of the installation process is not detected in step S309, the processing is returned to step S310.

When the installation of the corresponding function is complete, the procedure of step S310 is performed. In step S310, the activate process is performed using the license file so that the corresponding function is in the usable state. There is no need for the image forming device to communicate with the license management system in order to transfer a function/license between the devices.

In step S311, it is determined whether the image forming device is a license source device. When the image forming device is not a license source device, the license transfer managing part 112 is caused to update the license transfer management information in step S312. That is, the "license possession" information is changed to "YES" indicating that the license is possessed, and the "license source device" information is changed to indicate which device is the license source device. The "license duplication device" information remains unchanged (blank) because the license is used by only the license source device.

The case in which the image forming device is determined in step S311 as being the license source device corresponds to a case in which the image forming device was in the function-usable state as the license source device (the activate process was performed with the external system) but the transfer of the license of the corresponding function was requested from an external device, the license was transferred to the external device, the license of the image forming device was canceled, and then the license is received again from the external device.

When it is determined in step S311 that the image forming device is the license source device, the license transfer managing part 112 is caused to update the license transfer management information in step S313. That is, the "license possession" information is changed "YES" indicating that the license is possessed. Because the image forming device is determined as being the license source device, the "license source device" information is not updated. The "license duplication device" information is not updated because there is no need for indicating a license transfer path by the "license duplication device" information. After the step S313 is performed, the process of FIG. 5 is terminated in step S314.

When it is detected in step S309 that an error at the time of the installation process arises, an error process is performed in step S315. In the error process of step S315, the transmission of the installation data may be requested again. Or, when an error at the time of the reception of the installation data arises, it may be determined in step S315 that a license transfer failure arises. When the transmission data has no defect but an error in the installation process or the activate process arises, a recovery processing of the image forming device may be performed. However, when an error at the time of the recovery processing arises, the image forming device is in the state where the function cannot be used. In such a case, a rollback process may be performed so that the license is returned to the license transfer source device to ensure that there is no contradiction in the information managed by the license transfer managing part.

The installation data and the license file are received if needed in this process. However, if the license is transferred between the devices repeatedly, the devices may be in the state where the installation process is done or the license file is stored in each device. To avoid this, only a request for transfer of the license is sent to the request destination device. The transmission data needed for the license transfer management in this case is the "license source device" information and the "term of validity" (which is a term of validity in the license source device and not a term of validity of the license file).

There is no need to include the "license duplication device" information in the transmission data being sent to the request destination device. There is no need to include the "license possession" information in the transmission data being sent to the request destination device. However, when the rollback process is performed, it is necessary to send these information items included in the transmission data.

Figure 6:
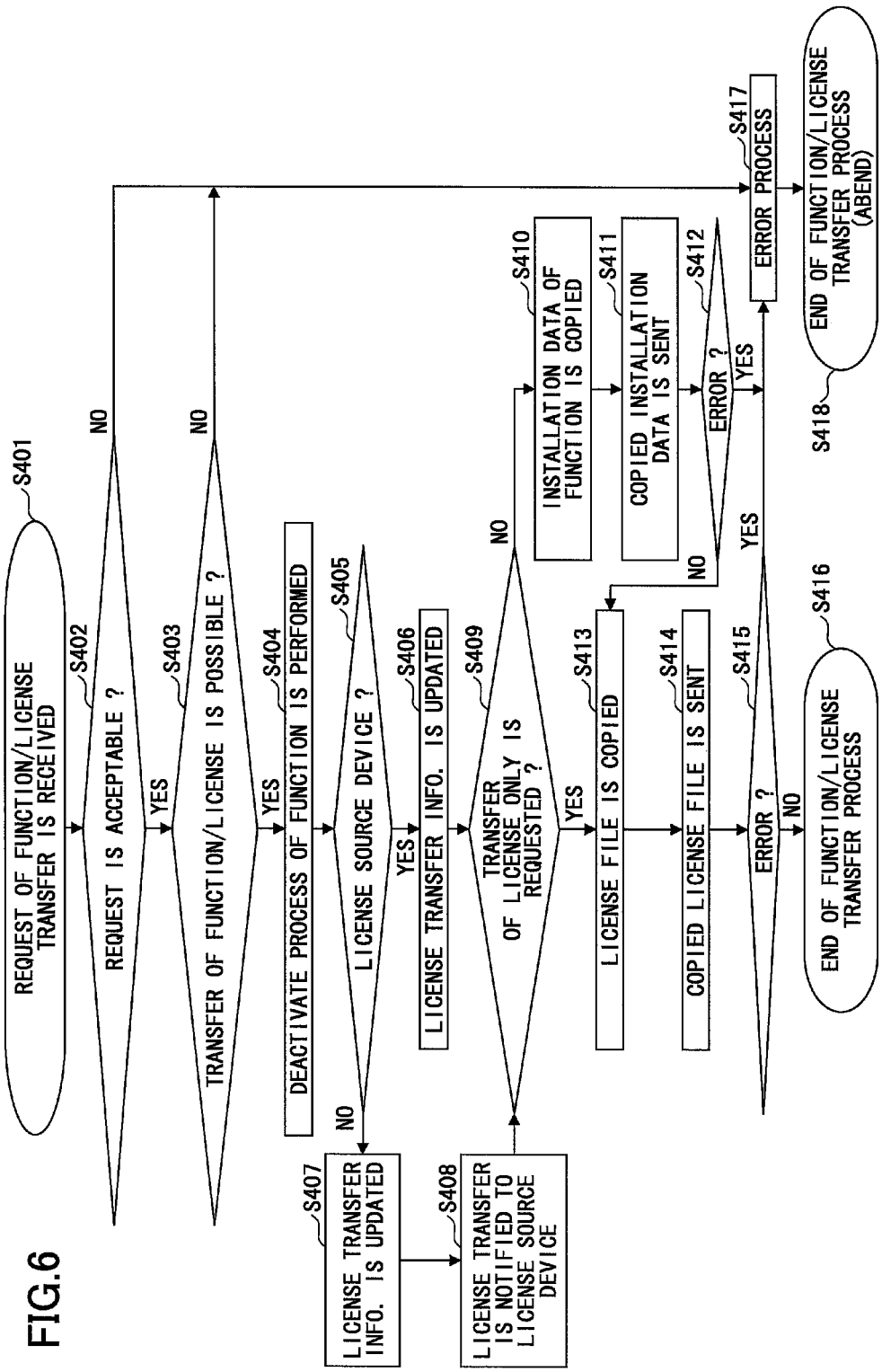
FIG. 6 is a flowchart for explaining an example of a process performed by the license transfer source device (request destination) during the license transfer.

FIG. 6 is a flowchart for explaining an example of a process performed by the license transfer source device (request destination) at the time of execution of license transfer.

When a function/license transfer request arrives at the license transfer source device (request destination) in step S401, the process of FIG. 6 is started. In step S402, it is determined whether the function/license transfer request is acceptable. When the license file is stored but the license is already transferred to another device, the license transfer is impossible. In this case, it is determined that the request is not acceptable.

When the license transfer request is accepted, in step S403, it is determined whether execution of the transfer of the function/license is possible. When the function corresponding to the license being requested is running or reserved for execution, it is determined that the function/license cannot be transferred.

When the license transfer can be executed, in step S404, the deactivate process of the corresponding function is performed so that the license transfer source device (request destination) changes into the state where the corresponding function cannot be used. Usually, in the deactivate process, the license is returned to the license management system. At the time of receiving the function/license transfer request, however, returning of the license to the license management system is not performed in order to allow the function/license transfer between the devices. In this embodiment, the license return is not performed but the invalidate process of the association between the function and the license is performed in the deactivate process.

In step S405, it is determined based on the information of the license transfer managing part 112 whether the image forming device is the license source device.

When the image forming device is the license source device, in step S406, the information of the request destination device is added to the "license duplication device" information by using the license transfer managing part 112. The "license possession" information is updated into the information indicating that the license is not held.

When the image forming device is not the license source device, in step S407, the "license possession" information is updated into the information indicating that the license is not held, by using the license transfer managing part 112. Because the image forming device is not the license source device, the "license duplication device" information is not treated.

In step S408, the information indicating that the license is transferred to another device is notified to the license source device. Upon receipt of this notice, the license source device adds the received information to the "license duplication device" information by using the license transfer managing part 112.

In step S409, it is determined whether only the transfer of the license file is required. It is assumed that the information as to whether the transfer of the installation data of the function itself is also required not only the transfer of the license file is contained in the function/license transfer request received at the step S402.

When the transfer of the installation data is also required, in step S410, the installation data of the corresponding function (i.e., the data of the sales package (PKG) in the release form) is copied.

In step S411, the reproduced installation data is transmitted to the device of the request source. If an error in the transmission of the installation data is not detected in step S412, the processing is transferred to step S413.

In step S413, the license file associated with the corresponding function is copied. In step S414, the reproduced license file is transmitted to the device of the request source.

If an error in the transmission of the license file is not detected in step S415, the process of function/license transfer is terminated in step S416. However, when an error in the transmission is detected in step S412 or S415, the information of the license transfer managing part 112 is updated. In the error process of step S417, the rollback process is performed so that the information of the license transfer managing part 112 is changed into the state before updating. After the step S417 is performed, the process of function/license transfer is terminated in step S418 as an abnormal end. The information that the rollback process is performed in the image forming device due to the error at the time of data transmission is sent to the request source device. In order to obtain matching in the management information between the devices, a request for performing the rollback process is sent to the request source device.

The retry processing may be performed several times when disconnection or the like arises and the information cannot be transmitted to the request source device. However, when the notice concerning the matching process cannot be sent at all and matching in the management information between the devices cannot be obtained, cancelling the license of the function temporarily may be also performed. In this case, displaying of a screen or sending of an e-mail may be performed to inform the user of the reason for having cancelled the license temporarily and to urge the user to take recovery measures. When the notice concerning the matching process can be sent and matching in the management information between the devices can be obtained, the invalidate process is canceled. In this case, the rollback process results in bringing the devices in the state before updating. In the rollback process in the request source device, the transmission data which is partially in an incomplete reception state may be deleted.

In the above-described process, both the installation data and the license file are copied if needed, and the duplicate data is transmitted. In a certain case, contradiction in the management information between the devices may arise if the license is transferred between the devices repeatedly. In this case, only the duplicate data of the license file may be transmitted to the request source device. The transmission data in this case contains only the information required for the license transfer management ("license source", "term of validity"). The term of validity of the license source device is included. In the case of the term of validity of the license file being included, the term of validity (for example, +3 months) is extended for each time of license transfer, which causes the license source device to follow the extended term of validity. Hence, the term of validity of the license source device should be included (that is, the term of validity of the request destination device should be applied).

Because the "license duplication device" information is notified from a device, other than the license source device, to another device at the time of license transfer, it is not necessary to transmit the "license duplication device" information at the time of license transfer. It is also not necessary to transmit the "license possession" information at the time of license transfer. However, when the rollback process is performed to obtain matching in the management information between the devices, it is necessary to transmit the "license possession" information.

Figure 7:
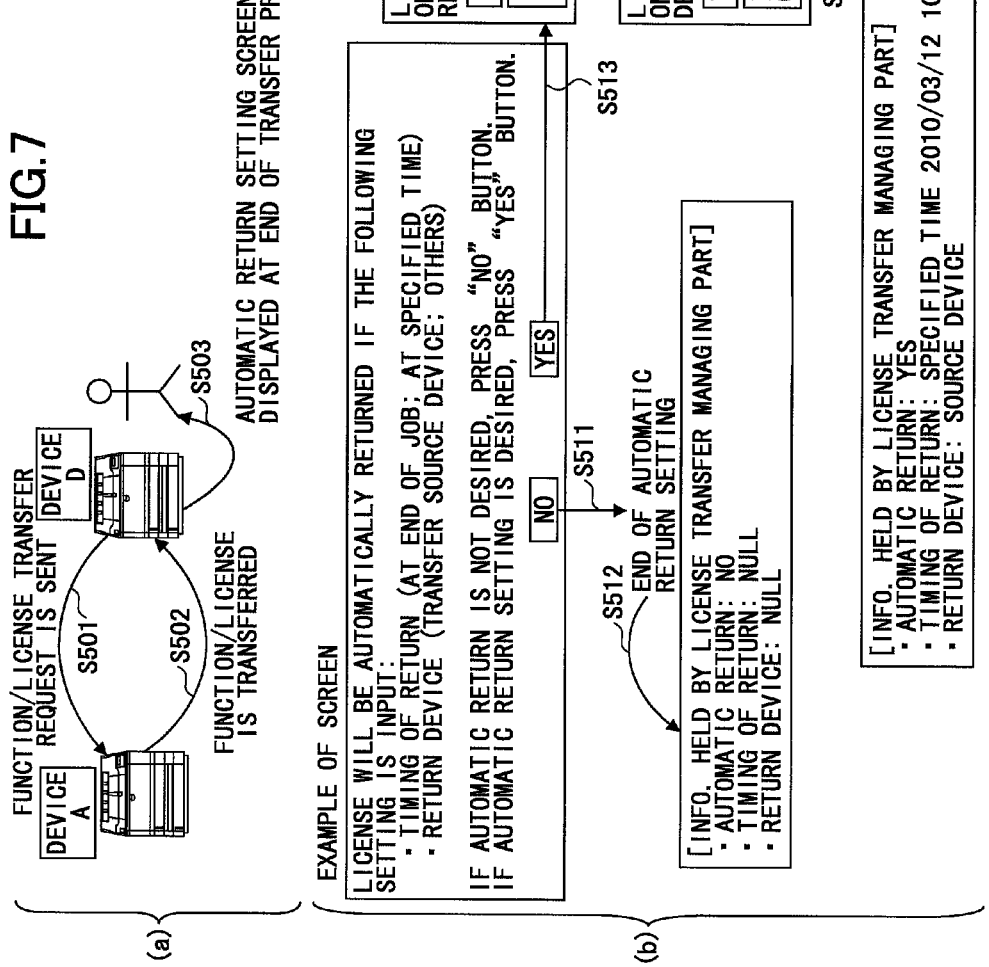
FIG. 7 is a diagram for explaining an example of a process of license automatic return setting.

FIG. 7 is a diagram for explaining an example of a process of license automatic return setting.

As shown in FIG. 7(a), when a license transfer request of a function is sent to the device A from the device D in step S501, the license transfer from the device A to the device D is performed in step S502. In the device D of the license transfer request side, an automatic return setting screen is displayed by the license transfer managing part 112 as a pop-up screen in step S503.

In the example, the user is urged to input setting information in a pop-up setting screen which is displayed immediately after the end of the license transfer. However, the present disclosure is not limited to this example. It is also possible to allow the user to input the setting information at all times so that the information stored therein may be corrected.

Subsequently, as shown in FIG. 7(b), the user is requested to select one of the option "automatic return setting" and the option "no return schedule". The automatic return setting changes depending on the user's choice.

When the option "no return schedule" is chosen in step S511, the "automatic return" information of the license transfer management information is set to "No" (not returning automatically) by the license transfer managing part 112 in step S512. The automatic return setting is ended at this step.

When the option "automatic return setting" is chosen in step S513, the user is requested to input the automatic return setting items "when" and "where". Regarding the setting item "when", there may be a case in which the user desires to use the function temporarily and return the license immediately at the end of use of the function. In this case, the user may select the "at end of job" option.

The license automatic return process may be performed immediately after the end of one job. However, there may be a case in which the user desires to input some jobs continuously. In this case, the user may be questioned at the end of one job about the necessity of inputting the next job continuously. When it is desired to input the next job continuously, the user is requested to press the NO button, and when it is not desired, the user is requested to press the YES button.

Alternatively, regarding the setting item "when", the concept of "time" may be used to specify the timing of automatically returning the license instead of using the concept of "job". In order to reduce the user load, default setting items for finely specifying the timing of the license automatic returning may be used, such as "by tonight (22:00)", "after one day" or "after one week".

In step S514, the setting item "when" is chosen and continuously the setting item "where" is chosen as a return destination. The setting item "license transfer source device (license source)" may be provided as the license source in the license transfer management information recognized by the license transfer managing part 112. In such a case, it is possible to perform the selection of "transferred material (device which carried out license transfer)" apart from the license source by adding the information of the transferred object "from which device it transferred" to the license transfer management information. That is, by the license transfer managing part 112, the device of the license source is specified and held in the license transfer management information. Therefore, when the setting item "license transfer source device" is designated by the license automatic return setting, the license is returned to the device of the license source indicated by the currently held information.

Apart from the candidate for return using the license transfer management information of the license transfer managing part 112, in order to allow the selection of the return destination after referring to the information of each device, it is also possible to return the license to a suitable device according to the function use frequency.

The setting item "according to function use frequency" may be designated by "the number of device registration users", "the frequency of use of a corresponding function" or "the installation place of a corresponding device".

In the case of the setting item "the number of device registration users", it is expected that the frequency of use of the device increases if there are many registration users, and the frequency of use of a corresponding function will also be increased.

In the case of the setting item "the frequency of use of a corresponding function", it is assumed that the license is returned to a device having a high frequency of use of the corresponding function. In the case of the setting item "the installation place of a corresponding device", it is necessary to enable the input of "installation place" supplementary information by initial setting of the device of the "installation place". When this information is designated as the transferred material as a candidate for return, the device of the transferred material may already have received the license of this function from another device and it is not necessary to return the license. In such a case, it is assumed that the license is transferred to another device on the floor that is the same as that of the installation place.

By selecting the setting item "where" in step S515, the license transfer management information is stored in step S516. When the "at end of job" option is chosen as the setting item "when", the license transfer managing part 112 notifies the option to the job managing part 106, and the job managing part 106 will monitor the end of the corresponding job.

When the device of the return destination is different from a device recognized by the license source, the device of the request destination can be transmitted to the device used as the license source. Namely, the transferred material (side from which a license is taken) offers the information of the device after transfer to the license source for detection of a transfer path (license copying destination device) including license automatic updating, but the license source device is not detected depending on the setting of the automatic return destination, and it is necessary to send the information. This is because the information of the license source is delivered as information of license transfer managing part 112 as for a return destination as for a returning device. Accordingly, it is necessary to determine whether the device of which a license automatic return setting is recognized by the "license duplication device" information recognized by the source device or the returning device (destination device).

Figure 8:
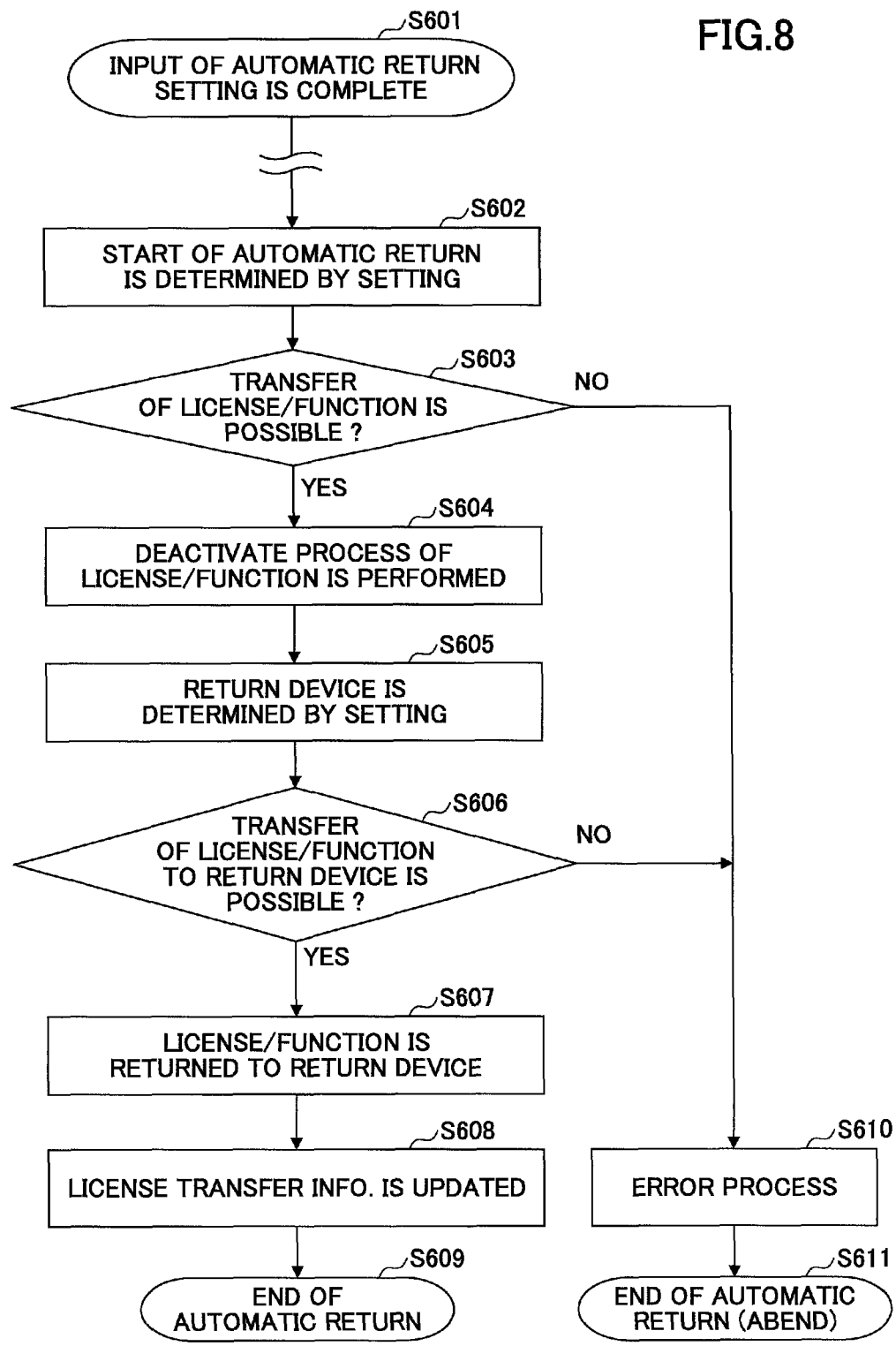
FIG. 8 is a flowchart for explaining an example of a process of license automatic return.

FIG. 8 is a flowchart for explaining an example of a process of license automatic return.

As shown in FIG. 8, when the automatic return setting is terminated in step S601, the process of FIG. 8 is started. In step S602, it is determined that the automatic return process is performed according to the automatic return setting (when). For example, when the automatic return setting indicates the option "at end of job", if the end of the job is recognized by the job managing part 106, the license transfer managing part 112 is notified about the timing, and the license transfer managing part 112 determines that it is the timing of automatic return processing execution.

When the automatic return setting indicates the option "time setting", the license transfer managing part 112 determines that the automatic return process is performed when the current time coincides with the set time.

In step S603, it is determined whether the transfer of the corresponding license (function) is possible. It is necessary to perform the license invalidation process (step S604) before the license return. However, when the transfer of the corresponding license is running, the license invalidation process cannot be performed.

When the corresponding license (function) cannot be transferred, an error process is performed in step S610. In the error process, the invalidate process of the license (function) is retried for a predetermined number of times, or an end of the transfer of the license/function is awaited. It is determined in step S611 that an error of the transfer of the corresponding license/function has occurred, without performing the retry processes.

When the corresponding license (function) can be transferred, the invalidate process of the corresponding function is performed as an advance preparation of the return process in step S604. When the invalidate process is already performed, the step S604 is skipped.

In step S605, a return request is sent to the return destination device according to the automatic return setting item (where). The return request is sent, the device state of return destination is checked, and if the function of return destination is already deleted, a license file, installation data, and license transfer managing part information (license source, term of validity) are transmitted.

Subsequently, in step S606, in the case of power supply OFF, a communication error, etc., the return destination device performs the retry process as the error process in step S610 by a predetermined number. When communication reservation cannot be carried out, the process treats this as an automatic transfer error.

When the device used as the candidate for return has already held the license for return (the process was made to transfer from license purchase or other devices), or when the candidate for return serves as power supply OFF or a communication error, change of a transferred object can be enabled according to a default priority level. It is the case which the automatic return setting is carried out, and transferred the license where the user wants to hold a short license, and is that return at the selected return destination was not terminated. The method of assigning a priority level to the returning to a suitable device is applicable without holding the license continuously.

An example of the setting of the default priority levels for license returning in this case is as follows,
(1) user setting (setting selected by the user)
(2) license source
(3) transferred material
(4) installation
(5) function use frequency
(6) the number of device registration users The setting of the default priority levels may be modified later.

When the automatic return can be performed about no devices based on the priority levels, the automatic return is stopped (when license possession is done by purchase and the device itself is retransferred in the case of power supply OFF etc.) and the license of the image forming device is validated again.

When the timing of automatic return setting is stored and the power supply of the image forming device is not able to perform automatic return to automatic return timing in OFF before returning automatically according to the setting, according to the setting, automatic return is performed after a reboot. That is, when the specified time is chosen, the license transfer is performed at the specified time after a reboot of the device.

The judgment as to whether all the user jobs are terminated before power stoppage about the job cannot be performed, and it is necessary to wait for an input of a new job, and to receive the report of the end of the input job (other transfer propriety).

When the receiving of a corresponding functional job is under execution, the function cannot be cancelled before performing the automatic return process at the automatic return setting timing. After assigning a priority level to the supplied job and completing these, the automatic return process is performed by performing the retry for a fixed number of times, but there is a time designated job as a kind of job.

In this case, it is referred to as NG when time specification of the point is carried out from the time specified as the automatic return timing. It is possible to prevent the problem that in spite of being the timing to return, an error of a corresponding job arises by the license (function) returned after the fixed time.

In step S607, the necessary data for the automatic return process to the return destination is sent (provision data changes with the device states of the return destination as in step S605).

In step S608, the license transfer management information of license transfer managing part 112 is updated with the completion of communication with a return destination. As the update object, the "license possession" information is changed from YES to NO, and the automatic return setting is initialized with the completion of return.

Figure 9:
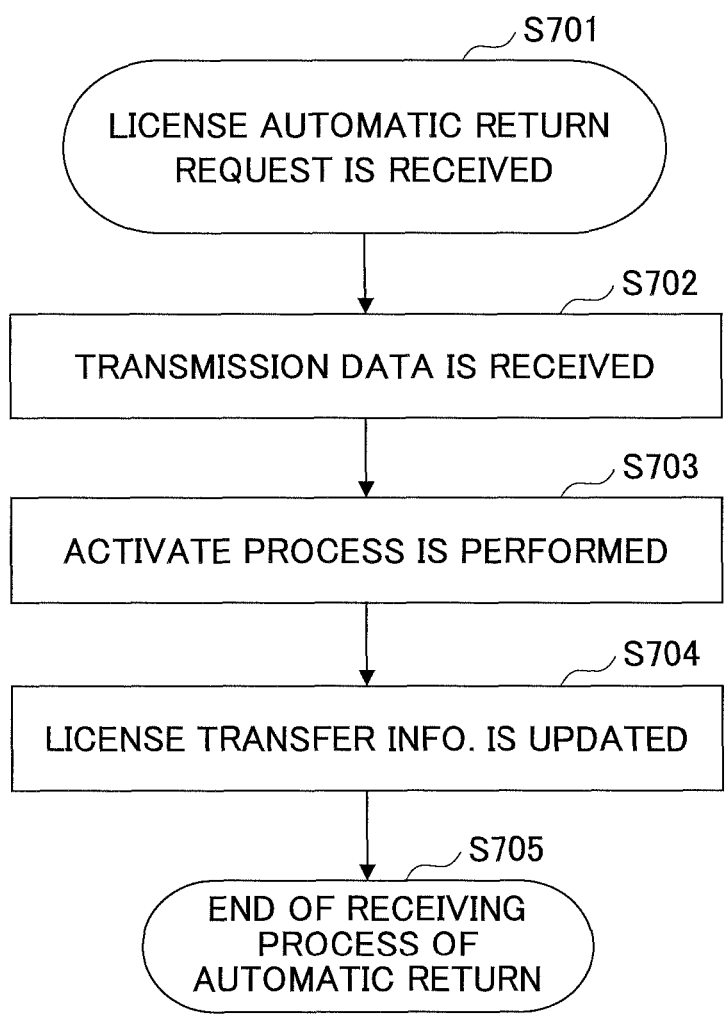
FIG. 9 is a flowchart for explaining an example of a process performed by the information processing device when a license automatic return request is received.

FIG. 9 is a flowchart for explaining an example of a process performed by the image forming device when a license automatic return request is received.

As shown in FIG. 9, a license automatic return request is received in step S701, and the process of FIG. 9 is started. The kind of data received or transmitted varies depending on the device configuration (license state for return) of the request received device, and the device configuration is notified to the request source at this time. When the corresponding function is already deleted in the image forming device, it is necessary to notify the request source that the corresponding functional data has been deleted in the image forming device. It is necessary to receive a license file, installation data, and license transfer management information from the request source, and to perform the installation (functional validation) process.

In step S702, the request source transmits only the data required for the device configuration to the image forming device, and the transmission data is received at the image forming device.

In step S703, the validation process of the corresponding license (function) is performed based on the received data. In step S704, the license transfer management information is updated. That is, the "license possession" information item in the license transfer management information is updated from YES to NO. Subsequently, the process of FIG. 9 is terminated.

Details of the license validation process (including the error process) in FIG. 9 are essentially the same as those of the previously described processes shown in FIGS. 5 and 6.

Figure 10:
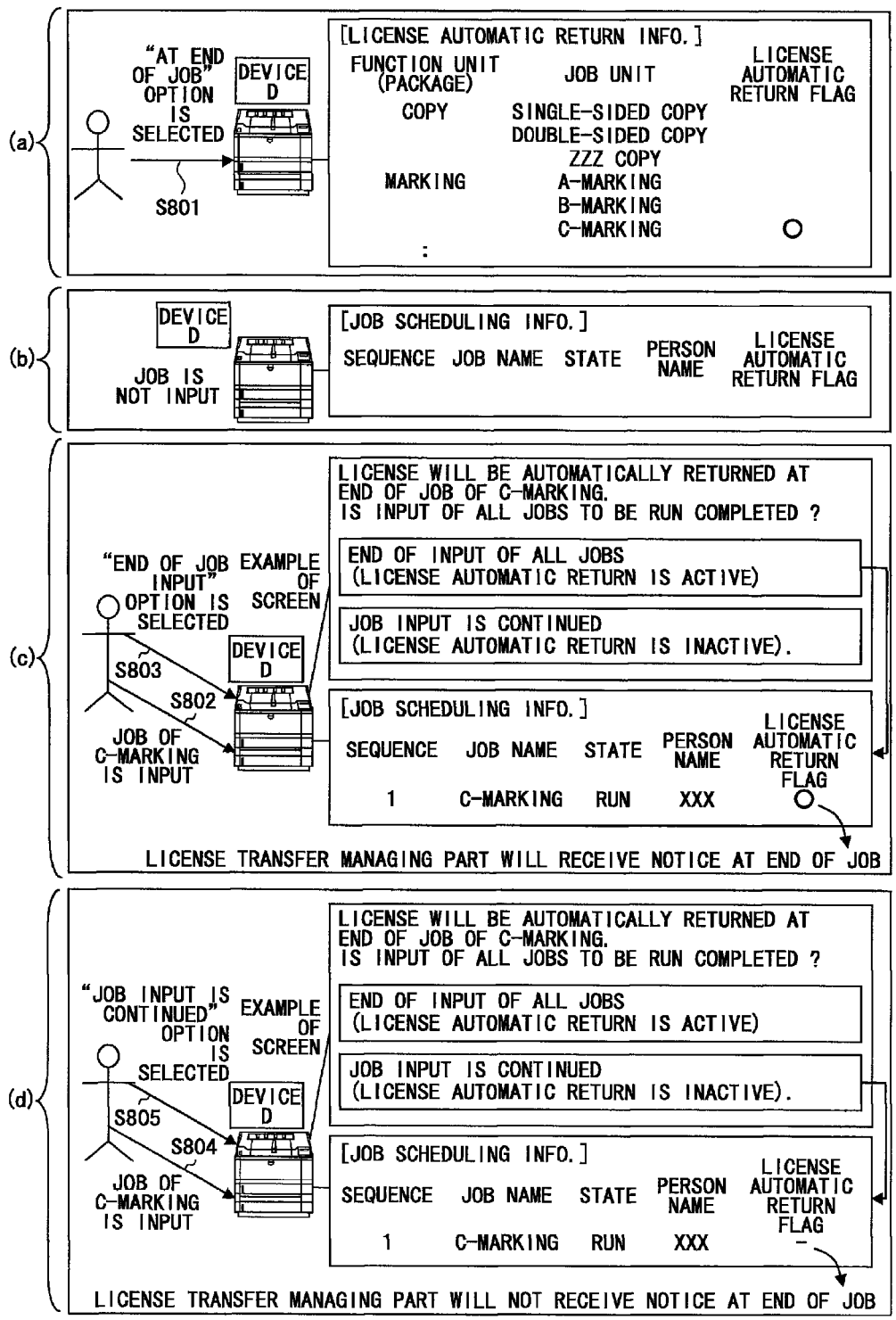
FIG. 10 is a diagram for explaining an example of a process performed by a job managing part of the image forming device of the present embodiment.

FIG. 10 is a diagram for explaining an example of a process performed by the job managing part 106 when the "at end of job" option is chosen as the automatic return setting.

When the "at end of job" option is chosen by the user in step S801 in FIG. 10 (a) (after the step S514 in FIG. 7), the license transfer managing part 112 in the device D receives the automatic return setting, and requests the job managing part 106 to send a notice to the license transfer managing part when a corresponding job is completed. The job managing part 106 sets the license automatic return flag of a corresponding job of a corresponding function unit in the license automatic return management information to "O". In the example, the state in which the license automatic return flag "O" is set at the job unit "C marking" corresponding to the functional processing module (package) "marking" is shown.

When the corresponding job in which the license automatic return flag is set is completed, the job managing part 106 notifies the license transfer managing part 112 of the end of the job. In order to recognize the end of the job, the license transfer managing part 112 performs license-device association management of the function (sales package) the license of which is received from the external device and the job by the license automatic return management information.

On the other hand, FIG. 10 (b) shows the job-scheduling information when a job is not input to the device D.

FIG. 10 (c) shows a case in which the job "C marking" is input by the user in step S802 and it is checked whether the input job is completed. If the option "end of input job" is chosen by the user in step S803, the job is input and the information of the job "C marking" is added to the job-scheduling information. The license automatic return flag "O" is stored in the license automatic return management information of FIG. 10 (*a*), and it is necessary to return the supplied job "C marking" at the end of the job. Hence, the license automatic return flag of the job-scheduling information is also set.

Subsequently, the input job "C marking" is performed and the job is terminated. When the end of the job execution is detected, the job managing part 106 notifies the license transfer managing part 112 that it is necessary to perform the license automatic return at the end of the job. For this purpose, the license (sales package) corresponding to the job is also notified.

Alternatively, the user who has performed the license automatic return setting may be specified. In this case, it is possible to avoid automatically returning the license in the execution of a job input by a user other than the user who has performed the license automatic return setting. Alternatively, the license transfer managing part 112 may be arranged to determine, when the end of a corresponding job is notified, the association of the job and the function (sales package). According to the result of this determination, the license transfer managing part 112 may start processing the license automatic return.

When the job "C marking" is input by the user in step S804, there is a case in which the input job is not completed or it is scheduled to input a job later. It is detected in step S805 that it is necessary to perform the job input continuously. When the continuing of the job input is necessary, the user is requested to select the option "job input is continued" as in FIG. 10 (*d*). At this time, it is not necessary to return the license at the end of the corresponding job, and the license automatic return information flag is not set. Therefore, in this case, it is not necessary, when the end of the job is detected by the job managing part 106, to notify the license transfer managing part 112 that it is necessary to perform the license automatic return at the end of the job.

Alternatively, the mechanism for storing a predetermined period may be arranged. In such a case, if the predetermined period has elapsed but a corresponding job is not received, the automatic return process may be started according to the license automatic return setting. By taking this measure, it is possible to prevent the non-starting of the automatic return process while waiting for an end of the existing job or an input of a new job.

If the flag of license automatic return is set after an end of all the corresponding jobs received but a request for cancellation of the corresponding jobs is received, it is possible to avoid the starting of the automatic return process. The flag of license automatic return is set by the job managing part 106 when the end of input of the job is detected according to the user's operation. In such a case, however, the flag is disregarded is the request for cancellation of the corresponding jobs is received, so that the starting of the automatic return process is avoided. This is because the user who sends the request may not be the same as the job input user.

In the above example, the "at end of job" option is chosen and execution of the license automatic return process is started on the basis of the job unit. Alternatively, execution of the license automatic return process may be started immediately after the license (sales package) transferred from another device is used. That is, it is not necessary that the timing of starting execution of the license automatic return process be limited to the job unit, but the timing of starting may be determined after the end of use of a corresponding function or license.

Figure 11:
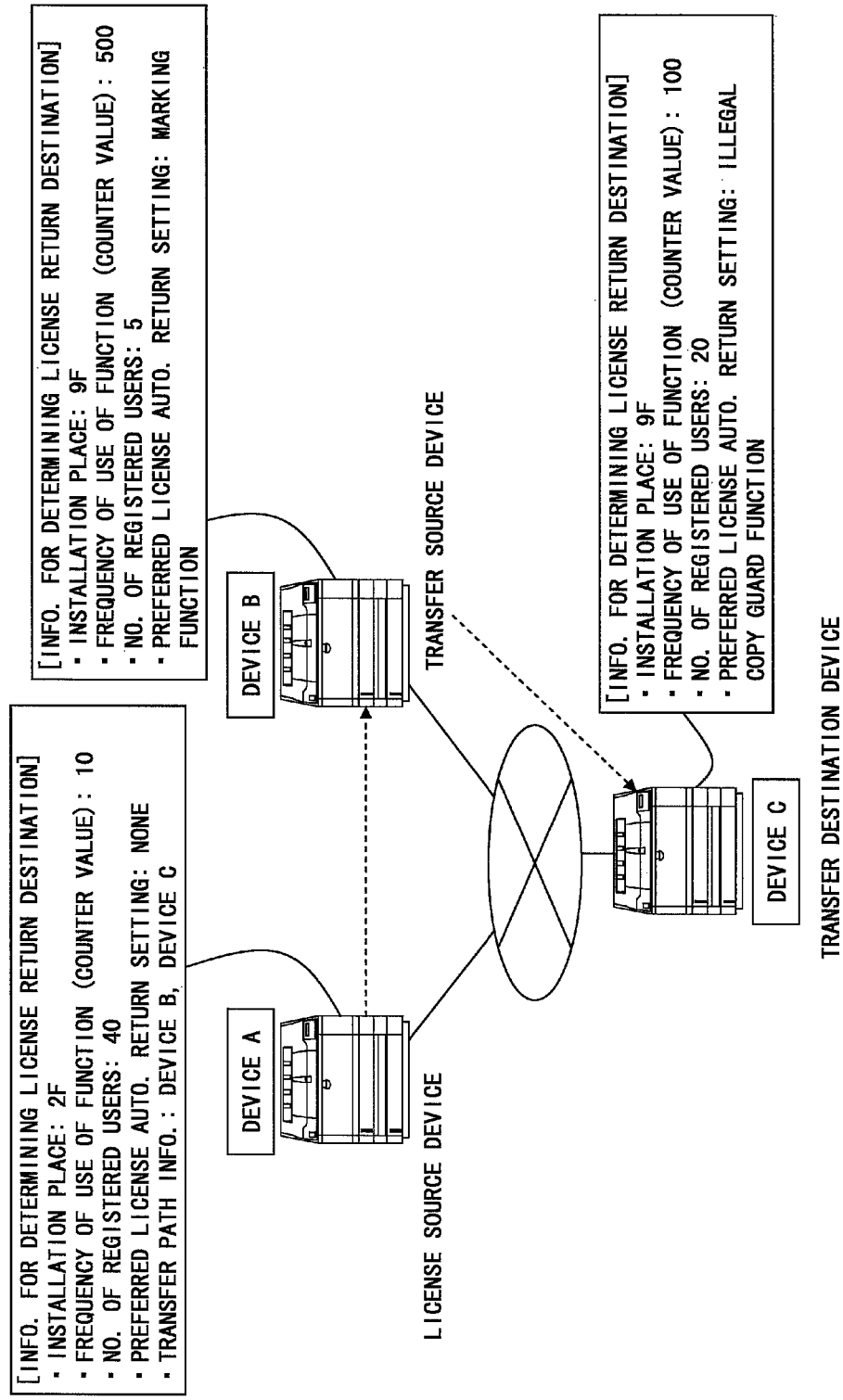
FIG. 11 is a diagram for explaining an example of a process of license automatic return according to the information of each device.

FIG. 11 is a diagram showing an example of a process of the license automatic return according to the information of each device. In FIG. 11, it is supposed that the device A purchases a function from a license management system (server) and is a license source device, the device B has received the function transferred from the device A, and the device C has received the function transferred from the device B.

Not only the transfer path of the license as a license automatic return destination but the device for which the device which can be regarded as the optimal after extracting the information of the device by which network connection is carried out is made into the request destination is also possible. In this case, the return destination is based on referring to the device information of "returning to a suitable device according to device use frequency", instead of a license transfer path setting after step S514 of FIG. 7.

In the example of FIG. 11, the installation place, the function use frequency (counter value), the number of registered users, the preferred license automatic return setting, etc. are shown for each device as information for determining license return destination. However, the information for determining license return destination is not restricted to this example.

Regarding the installation place, the following point is to be considered. When the setting is to return the license to the device A from the device C (returned to the license source), there is a case in which, after the license is transferred to the device C, the device A has purchased a new license or has received a license of a corresponding function transferred from an external device. That is, in this case, at the time of returning the license to the device A, it is no longer necessary for the device A to receive the license. Therefore, there may be a case in which it is desired to return the license to another device on the floor of the installation place of the device C. In this embodiment, the user is able to select each device as license return destination in view of the installation place. The information of the installation place may be acquired from the initial setting item of each device.

In the example of FIG. 11, the return destination of the license automatic return setting is to be chosen by the "installation place", and, for example, if the request destination is set to "9F", the license will be returned to the device B.

Regarding the function use frequency (counter value), the following point is to be considered. It may be desirable that the license be returned to a device with high frequency of use. In this embodiment, the user is able to select each device as license return destination in view of the function use frequency. Since the counter value of each function is managed by the device in many cases, acquisition of this information is possible.

In the example of FIG. 11, when the return destination of the license automatic return setting is chosen by the "function use frequency", the license will be returned to the device B with a largest function use frequency setting (counter value) stored.

Regarding the number of registered users, the following point is to be considered. It is conceivable that the frequency of use of each function is high in a device with a large number of registered users. In this embodiment, the user is able to select each device as license return destination in view of the number of registered users. In many cases, the number of registered users is held in the form of an address book in each device, and acquisition of this information is possible.

In the example of FIG. 11, when the return destination of the license automatic return setting is chosen by the "number of registered users", the license will be transferred to the device A with most registered users.

In the example of FIG. 11, the preferred license automatic return setting is also provided as an item of the information for determining license return destination. The following point is to be considered regarding the preferred license automatic return setting. There is a case in which a corresponding license is currently unable to be transferred for some reasons. In this embodiment, the user is able to select each device as license return destination in view of the preferred license automatic return setting.

In the example, when the return destination of the license automatic return setting is chosen by the "preferred license automatic return", whose setting indicates the "marking function", the license will be returned to the device B in which the corresponding preferred license automatic return setting (the "marking function") is stored.

In the foregoing, the license automatic return process is based on the license automatic return setting. When a license transfer request is received from an external device before the timing of license automatic return, a higher priority level can be assigned to the license transfer request from the external device, and a corresponding license can be transferred to the request source in response to the request. On the contrary, when a license transfer request is received from an external device before the timing of license automatic return, a higher priority level can be assigned to the license automatic return setting of the image forming device, and the license transfer request received from the external device can be canceled.

Alternatively, the image forming device of the present disclosure may be arranged to include a mode selecting part to urge a user to select one of a first mode and a second mode for the automatic return part. If the first mode is selected, the automatic return part is arranged so that, when a license transfer request is received from an external device before the timing of license automatic return, a higher priority level is assigned to the received license transfer request and the license is transferred to a requested return device in response to the request. If the second mode is selected, the automatic return part is arranged so that, when a license transfer request is received from an external device before the timing of license automatic return, a higher priority level is assigned to the automatic return conditions stored in the image forming device and the received license transfer request is canceled.

As described in the foregoing, according to the present disclosure, it is possible to provide an information processing device which is capable of easily transferring a license of an installed program to another device, without increasing the user load and without using a license key, and capable of automatically returning the license to a desired device after the transferring of the license.

The present disclosure is not limited to the specifically disclosed embodiments, and variations and modifications may be made without departing from the scope of the present disclosure.

The present application is based upon and claims the benefit of priority of the prior Japanese patent application No. 2010-123412, filed on May 28, 2010, the contents of which are incorporated herein by reference in their entirety.

What is claimed is:

1. An information processing device, comprising:
a processor configured to control the information processing device;
an installation unit to download installation data of an application program corresponding to a function from an external device and install the application program in the information processing device;
a license acquisition unit to acquire a license file from an external device in order to activate the function in the information processing device;
a license managing unit to manage presence of a license of the function in the information processing device independently of presence of the license file;
a license transfer managing unit to transfer the license from a source device to a destination device and update the presence of the license of the function; and
an automatic return unit to automatically return the transferred license to the source device according to automatic return conditions stored in the information processing device,
wherein the automatic return conditions comprise device information containing identification information of each of a plurality of devices to which a set of priority levels are assigned, and
wherein the automatic return unit is arranged so that, when the source device is in a power OFF state or the license is already returned to the source device, the license is returned to one of the plurality of devices which is determined according to the set of priority levels.

2. The information processing device according to claim 1, wherein the automatic return conditions comprise a timing of returning the license from the destination device to the source device, wherein the timing is defined by a time of day.

3. The information processing device according to claim 1, wherein the automatic return conditions comprise a timing of returning the license from the destination device to the source device, wherein the timing is defined by a time of an end of a job using the function of the license to be returned to the source device.

4. The information processing device according to claim 3, wherein the automatic return conditions comprise user information that specifies a user who stores the automatic return conditions in the information processing device, and the automatic return unit is arranged to inhibit the automatic returning of the license from being performed when a job is input by a user other than the specified user.

5. The information processing device according to claim 3, wherein the automatic return unit is not performed when a request for cancellation of the jobs is received after all input jobs are completed even when an automatic return flag is set.

6. The information processing device according to claim 3, wherein the automatic return unit is arranged to allow, when a corresponding job is not input over a predetermined period, the license to be returned to the source device according to the automatic return conditions.

7. The information processing device according to claim 6, wherein the information processing device comprises a storing unit to store the predetermined period.

8. The information processing device according to claim 1, wherein the automatic return conditions comprise device information of a device disposed along a license transfer path of a corresponding license between the source device and the destination device.

9. The information processing device according to claim 1, wherein the automatic return conditions comprise device information of a device different from the source device.

10. The information processing device according to claim 1, wherein, when a timing of returning the license to the source device is exceeded during a power OFF state of the image forming device, the automatic returning of the license is restarted upon a reboot of the image forming device occurring after the power OFF state.

11. The information processing device according to claim 1, wherein the automatic return unit is arranged so that, when the automatic returning of the license is not performed for any of the plurality of devices based on the set of priority levels, the automatic returning of the license is stopped.

12. The information processing device according to claim 1, wherein the automatic return unit is arranged so that, when a license transfer request is received from an external device prior to a timing of returning the license, a higher priority level is assigned to the license transfer request received from the external device, and the license is transferred to a requested return device in response to the request.

13. The information processing device according to claim 1, wherein the automatic return unit is arranged so that, when a license transfer request is received from an external device prior to a timing of returning the license, a higher priority level is assigned to the automatic return conditions stored in the image forming device, and the license transfer request received from the external device is canceled.

14. The information processing device according to claim 1, further comprising a mode selecting unit to urge a user to select one of a first mode and a second mode for the automatic return unit,
wherein, if the first mode is selected, the automatic return unit is arranged so that, when a license transfer request is received from an external device prior to a timing of returning the license, priority is assigned to the received license transfer request and the license is transferred to a requested return device in response to the request, and
wherein, if the second mode is selected, the automatic return unit is arranged so that, when a license transfer request is received from an external device prior to a timing of returning the license, priority is assigned to the automatic return conditions stored and the received license transfer request is canceled.

15. The information processing device according to claim 1, wherein, when a requested return device to which the license is to be returned is different from a device recognized by the source device, device information of the destination device is transmitted to the source device.

16. An information processing method for use in an information processing device, the information processing method comprising:
downloading, by an installation unit of the information processing device, installation data of an application program corresponding to a function from an external device to install the application program in the information processing device;
acquiring, by a license acquisition unit of the information processing device, a license file from an external device in order to activate the function in the information processing device;
managing, by a license managing unit of the information processing device, presence of a license of the function in the information processing device independently of presence of the license file;
transferring, by a license transfer managing unit of the information processing device, the license from a source device to a destination device to update the presence of the license of the function; and
returning, by an automatic return unit of the information processing device, the transferred license to the source device automatically according to automatic return conditions stored in the information processing device,
wherein the automatic return conditions comprise device information containing identification information of each of a plurality of devices to which a set of priority levels are assigned, and
wherein the automatic return unit is arranged so that, when the source device is in a power OFF state or the license is already returned to the source device, the license is returned to one of the plurality of devices which is deteimined according to the set of priority levels.

17. A non-transitory computer-readable recording medium storing a program which, when executed by a computer, causes the computer to perform an information processing method for use in an information processing device, the information processing method comprising:
downloading, by an installation unit of the information processing device, installation data of an application program corresponding to a function from an external device to install the application program in the information processing device;
acquiring, by a license acquisition unit of the information processing device, a license file from an external device in order to activate the function in the information processing device;
managing, by a license managing unit of the information processing device, presence of a license of the function in the information processing device independently of presence of the license file;
transferring, by a license transfer managing unit of the information processing device, the license from a source device to a destination device to update the presence of the license of the function; and
returning, by an automatic return unit of the information processing device, the transferred license to the source device automatically according to automatic return conditions stored in the information processing device,
wherein the automatic return conditions comprise device information containing identification information of each of a plurality of devices to which a set of priority levels are assigned, and
wherein the automatic return unit is arranged so that, when the source device is in a power OFF state or the license is already returned to the source device, the license is returned to one of the plurality of devices which is determined according to the set of priority levels.

* * * * *